United States Patent
Agarwal et al.

(10) Patent No.: US 8,245,219 B2
(45) Date of Patent: Aug. 14, 2012

(54) STANDARDIZED MECHANISM FOR FIRMWARE UPGRADES OF RFID DEVICES

(75) Inventors: Abhishek Agarwal, Hyderabad (IN); Krishnan Gopalan, Hyderabad (IN); Ramachandran Venkatesh, Hyderabad (IN); Mohamed Fakrudeen Ali Ahmed, Coimbatore (IN); Jayaraman Kalyana Sundaram, Hyderabad (IN); Anush Kumar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1360 days.

(21) Appl. No.: 11/626,968

(22) Filed: Jan. 25, 2007

(65) Prior Publication Data

US 2008/0184151 A1    Jul. 31, 2008

(51) Int. Cl.
*G06F 9/445* (2006.01)
(52) U.S. Cl. ........ 717/172; 717/168; 717/173; 717/175; 717/176
(58) Field of Classification Search .................. None
See application file for complete search history.

(56) References Cited

U.S. PATENT DOCUMENTS

| | | | |
|---|---|---|---|
| 5,650,768 A | 7/1997 | Eswaran | |
| 5,682,529 A * | 10/1997 | Hendry et al. | 713/100 |
| 5,910,776 A | 6/1999 | Black | |
| 6,108,712 A | 8/2000 | Hayes | |
| 6,405,261 B1 | 6/2002 | Gaucher | |
| 6,631,363 B1 | 10/2003 | Brown et al. | |
| 6,677,852 B1 | 1/2004 | Landt | |
| 6,732,923 B2 | 5/2004 | Otto | |
| 6,784,802 B1 | 8/2004 | Stanescu | |
| 6,859,831 B1 | 2/2005 | Gelvin et al. | |
| 6,862,735 B1 | 3/2005 | Slaughter | |
| 6,908,034 B2 | 6/2005 | Alleshouse | |
| 6,920,330 B2 | 7/2005 | Caronni et al. | |
| 6,943,683 B2 | 9/2005 | Perret | |
| 7,005,985 B1 | 2/2006 | Steeves | |
| 7,155,302 B2 | 12/2006 | Hayes et al. | |
| 7,204,409 B2 | 4/2007 | Kumar et al. | |
| 7,267,275 B2 | 9/2007 | Cox et al. | |
| 7,295,116 B2 | 11/2007 | Kumar et al. | |
| 7,382,260 B2 | 6/2008 | Agarwal et al. | |
| 7,484,664 B2 | 2/2009 | Shafer | |
| 7,526,545 B2 * | 4/2009 | Jerome | 709/224 |
| 7,619,521 B2 * | 11/2009 | Williams et al. | 340/572.1 |
| 2002/0054080 A1 * | 5/2002 | Belanger et al. | 345/738 |
| 2002/0059471 A1 | 5/2002 | Sanghvi et al. | |
| 2002/0070865 A1 | 6/2002 | Kenneth et al. | |

(Continued)

FOREIGN PATENT DOCUMENTS

EP        11632893      3/2006

(Continued)

OTHER PUBLICATIONS

"The Business Value of Radio Frequency Identification (RFID)" (2006) Microsoft Corporation, 21 pages.

(Continued)

*Primary Examiner* — Isaac Tecklu

(57) ABSTRACT

The claimed subject matter provides a system and/or a method that facilitates managing a device within a radio frequency identification (RFID) network. A radio frequency identification (RFID) network can include at least one device that receives data from a tag. An upgrade component can evaluate at least one device and identify an applicable portion of firmware for the device based on the evaluation, wherein the applicable portion of firmware can be independently deployed to the device.

20 Claims, 12 Drawing Sheets

U.S. PATENT DOCUMENTS

| | | |
|---|---|---|
| 2002/0103819 A1 | 8/2002 | Duvillier et al. |
| 2002/0140966 A1* | 10/2002 | Meade et al. ............... 358/1.15 |
| 2002/0170952 A1 | 11/2002 | Alsafadi et al. |
| 2002/0188934 A1* | 12/2002 | Griffioen et al. ............. 717/170 |
| 2003/0041127 A1 | 2/2003 | Turnbull et al. |
| 2003/0135576 A1 | 7/2003 | Bodin |
| 2003/0144926 A1 | 7/2003 | Bodin et al. |
| 2003/0167238 A1 | 9/2003 | Zeif |
| 2003/0204711 A1* | 10/2003 | Guess ............................ 713/1 |
| 2003/0210821 A1 | 11/2003 | Yogeshwar et al. |
| 2003/0225928 A1 | 12/2003 | Stephen |
| 2003/0227392 A1 | 12/2003 | Elbert et al. |
| 2004/0024658 A1 | 2/2004 | Carbone et al. |
| 2004/0046642 A1 | 3/2004 | Becker et al. |
| 2004/0070491 A1 | 4/2004 | Huang et al. |
| 2004/0103139 A1 | 5/2004 | Hubbard et al. |
| 2004/0107418 A1* | 6/2004 | Hattori et al. ................ 717/174 |
| 2004/0111335 A1 | 6/2004 | Black et al. |
| 2004/0139200 A1* | 7/2004 | Rossi et al. .................. 709/228 |
| 2004/0193449 A1 | 9/2004 | Wildman et al. |
| 2004/0193641 A1 | 9/2004 | Lin |
| 2004/0215667 A1 | 10/2004 | Taylor et al. |
| 2004/0230963 A1 | 11/2004 | Rothman et al. |
| 2004/0255291 A1* | 12/2004 | Sierer et al. .................. 717/174 |
| 2005/0035860 A1 | 2/2005 | Taylor et al. |
| 2005/0062603 A1 | 3/2005 | Fuerst et al. |
| 2005/0088420 A1 | 4/2005 | Dodge et al. |
| 2005/0092825 A1 | 5/2005 | Cox et al. |
| 2005/0144612 A1 | 6/2005 | Wang et al. |
| 2005/0150952 A1 | 7/2005 | Chung |
| 2005/0150953 A1 | 7/2005 | Alleshouse |
| 2005/0189444 A1 | 9/2005 | Kost |
| 2005/0198228 A1* | 9/2005 | Bajwa et al. .................. 709/220 |
| 2005/0237194 A1 | 10/2005 | VoBa |
| 2005/0257215 A1 | 11/2005 | Denby et al. |
| 2005/0262189 A1 | 11/2005 | Mamou et al. |
| 2006/0022800 A1 | 2/2006 | Krishna et al. |
| 2006/0026080 A1 | 2/2006 | Rodriguez et al. |
| 2006/0043165 A1 | 3/2006 | Kumar et al. |
| 2006/0044111 A1 | 3/2006 | Kollar et al. |
| 2006/0047464 A1 | 3/2006 | Kumar et al. |
| 2006/0047545 A1 | 3/2006 | Kumar et al. |
| 2006/0047646 A1 | 3/2006 | Maluf et al. |
| 2006/0047787 A1 | 3/2006 | Agarwal et al. |
| 2006/0047789 A1 | 3/2006 | Kumar et al. |
| 2006/0053234 A1 | 3/2006 | Kumar et al. |
| 2006/0055508 A1 | 3/2006 | Kumar et al. |
| 2006/0055564 A1 | 3/2006 | Olsen et al. |
| 2006/0058987 A1 | 3/2006 | Kumar et al. |
| 2006/0075210 A1 | 4/2006 | Manohar et al. |
| 2006/0080074 A1 | 4/2006 | Williams et al. |
| 2006/0108411 A1 | 5/2006 | Macurek et al. |
| 2006/0136710 A1 | 6/2006 | Oka et al. |
| 2006/0143439 A1 | 6/2006 | Arumugam et al. |
| 2006/0174242 A1 | 8/2006 | Zhu et al. |
| 2006/0176169 A1 | 8/2006 | Doolin et al. |
| 2006/0202825 A1 | 9/2006 | Rajapakse et al. |
| 2006/0214794 A1 | 9/2006 | Wang |
| 2006/0226981 A1 | 10/2006 | Gregersen et al. |
| 2007/0024463 A1 | 2/2007 | Hall et al. |
| 2007/0027964 A1* | 2/2007 | Herrod et al. ................. 709/220 |
| 2007/0033585 A1* | 2/2007 | Fukui ............................ 717/168 |
| 2007/0035396 A1 | 2/2007 | Chand |
| 2007/0044092 A1* | 2/2007 | Banerjee ....................... 717/176 |
| 2007/0046467 A1* | 3/2007 | Chakraborty et al. ..... 340/572.1 |
| 2007/0050236 A1* | 3/2007 | Esposito-Ross et al. ....... 705/10 |
| 2007/0109100 A1 | 5/2007 | Jett et al. |
| 2007/0136278 A1 | 6/2007 | Grazioli et al. |
| 2007/0207792 A1* | 9/2007 | Loving .......................... 455/418 |
| 2007/0250830 A1* | 10/2007 | Holmberg et al. ............ 717/171 |
| 2008/0163173 A1* | 7/2008 | Bauer et al. ................... 717/122 |
| 2008/0288625 A1* | 11/2008 | Agarwal et al. ............... 709/223 |
| 2009/0019061 A1* | 1/2009 | Scannell, Jr. ................... 707/10 |
| 2009/0037899 A1* | 2/2009 | Dharap et al. ................. 717/173 |
| 2010/0005175 A1* | 1/2010 | Swildens et al. .............. 709/226 |
| 2010/0211515 A1* | 8/2010 | Woodings et al. ............ 705/320 |
| 2010/0257099 A1* | 10/2010 | Bonalle et al. .................. 705/50 |
| 2010/0262923 A1* | 10/2010 | Citrin et al. ................... 715/752 |

FOREIGN PATENT DOCUMENTS

| | | |
|---|---|---|
| GB | 2372894 B2 | 10/2002 |
| WO | 03102845 | 12/2003 |
| WO | 2005078633 | 8/2005 |

OTHER PUBLICATIONS

"Universal Serial Bus Device Class Specification for Device Firmware Upgrade" (1999) USB Device Firmware Upgrade Specification, Revision 1.0, 44 pages.

IBM "alphaWorks:RFID Device Development Kit: Overview". Http://www.alphaworks.ibm.com/tech/rfiddevice. Last viewed Nov. 7, 2005, 1 page.

Alien "ALR-9800 Enterprise RFID Reader". Http://www. alientechnology.com/docs/AT_DS_9800_v3_WEB.pdf. Last viewed Nov. 17, 2005, 4 pages.

European Search Report dated Oct. 2, 2006, mailed Feb. 10, 2006 for European Patent Application Serial No. 05107796, 6 pages.

Tsetsos, et al., "Commercial Wireless Sensor Networks: Technical and Business Issues". Proceedings of the Second Annual Conference on Wireless On-Demand Network Systems and Services (Jan. 19-21, 2005 8 pages.

Branch, et al., "Sentire: A Framework for Building Middleware for Sensor and Actuator Networks" Proceedings of the Third International Conference on Pervasive Computing and Communications Workshops Mar. 8, 2005) pp. 396-400.

Harrison, et al., "Information Management in the Product Lifecycle—the Role Networked RFID". Proceedings of the Second IEE International Conference (Jun. 24, 2004) pp. 507-512.

Bornhovd, et al., "Integrating Smart Items with Business Processes an Experience Report". Proceedings of the Thirty-Eighth Hawaii International Conference on System Science (Jan. 3, 2005) 8 pages.

Ganesh, et al., "Web Services and Multi-Channel Integration: A Proposed Framework" Prceedings of the IEEE International Conference on Web Services (Jul. 6, 2004) 8 pages.

European Search Report dated Feb. 6, 2006, mailed Feb. 6, 2006 for European Patent Application Serial No. 05107826, 7 pages.

Ortiz, "An Introduction to Java Card Technology—Part I". Http://developers.sun.com/techtopics/mobility/javacard/articles/javacard1. Last viewed Dec. 19, 2005, 14 pages.

Chen, "Understanding Java Card 2.0" URL:com//javaworld/jw-03-1998/jw-03-javadev_p.html. Last viewed Dec. 19, 2005, 12 pages.

European Search Report dated Feb. 7, 2006, mailed Feb. 7, 2006 for European Patent Application Serial No. EP 05 108001; 7 pages.

European Search Report dated Mar. 9, 2006 mailed Mar. 22, 2006 for European Patent Application Serial No. EP05107794.9, 7 pages.

Anonymous, "The Sun Global RFID Betwork Vision: Connecting Businesses at the Edge of Network" Internet Article, Jul. 2004, http://www.sun.com/software/solutions/rfid/Sun_RFIS_Vision_rla_pdf.

European Search Report dated Apr. 10, 2006 for EP05108005.9, 9 pages.

European Search Report dated May 11, 2006 for EP Application Serial No. EP05107744.4, 9 pages.

Bawa, et al., Real-Time Inventory Using RFIS: (2004) Group Four, 39 pages.

Floerkemier, et al. "PML Core Specification 1.0" Sep. 13, 2003, Auto-ID Center, Version 1.0, 48 pages.

International Search Report dated and mailed Jul. 27, 2007 for PCT Application Serial No. PCT 207/004005, 6 pages.

Notice of Allowance dated Feb. 13, 2008 for U.S. Appl. No. 11/325,181, 32 pages.

OA dated Apr. 5, 2010 for U.S. Appl. No. 12/125,947, 27 pages.
OA dated Sep. 17, 2010 for U.S. Appl. No. 12/125,947, 21 pages.
OA dated Apr. 23, 2010 for U.S. Appl. No. 11/460,772, 41 pages.
Notice of Allowance dated Feb. 10, 2011 for U.S. Appl. No. 11/460,772, 21 pages.
OA dated Mar. 28, 2011 for U.S. Appl. No. 11/460,796, 38 pages.
OA dated Oct. 20, 2010 for U.S. Appl. No. 11/460,796, 36 pages.
OA dated Jun. 11, 2009 for U.S. Appl. No. 11/460,830, 35 pages.

Notice of Allowance dated Dec. 3, 2009 for U.S. Appl. No. 11/460,830, 8 pages.
BEA Systems Inc. "BEA WebLogic RFID Enterprise Server Rock-solid Foundation for Centralized Data and Infrastructure Management for Enterprise-Scale RFID Deployments" (2006) BEA Systems, Inc. Product Data Sheet, 8 pages.

Tsuji et al. "Asset Management Solution Based RFID" (2004) NEC of Advanced Technologies vol. 1 No. 3, pp. 188-193.
OA dated Apr. 5, 2010 for U.S. Appl. No. 11/625,862, 10 pages.
OA dated Aug. 12, 2011 for U.S. Appl. No. 11/460,796, 33 pages.

* cited by examiner

STANDARDIZED MECHANISM FOR FIRMWARE UPGRADES OF RFID DEVICES

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, etc. Moreover, various makes, models, and/or types can be associated with respective components (e.g., tag, devices, RFID devices, tag readers, tag programming stations, circulation readers, sorting equipment, tag inventory wands, . . . ). Each component and/or device may require software updates and/or manipulations in order to function properly, wherein such updates for each component and/or device may be released at disparate times. Thus, properly updating components and/or devices with appropriate software can be an increasingly difficult task based on the large number of components and/or devices, various software updates, and the disparate timing of software releases.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate ascertaining a portion of applicable firmware related to a device within an RFID network in order to ensure and/or maintain current data is employed on the device. An upgrade component can automatically identify a portion of applicable firmware based on a selected device within an RFID network. The device can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. In particular, the upgrade component can evaluate a device within the RFID network to ascertain various details associated therewith (e.g. make, model, brand, type, functionality, firmware installed/deployed, etc.), wherein a portion of applicable firmware can be identified and deployed based upon such evaluation. In other words, the upgrade component can automatically locate firmware that can be deployed to a device within the RFID network.

In accordance with an aspect of the claimed subject matter, the upgrade component can utilize a bulk component that facilitates identifying portions of applicable firmware and deploying such portions of applicable to respective devices in an independent and concurrent manner. In accordance with yet another aspect of the subject innovation, the upgrade component can utilize a firmware resource that can provide a portion of firmware. The firmware resource can be, for instance, a provider, a third-party, a service, a third-party service, a vendor, a manufacturer, a device-maker, a company, a web-service, a website, a database, an email, a data store, a local service, a remote party, and/or most any suitable entity that can provide a portion of firmware. In other aspects of the claimed subject matter, methods are provided that facilitate identifying a portion of firmware respective to a device within an RFID network in order to deploy applicable firmware to the device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
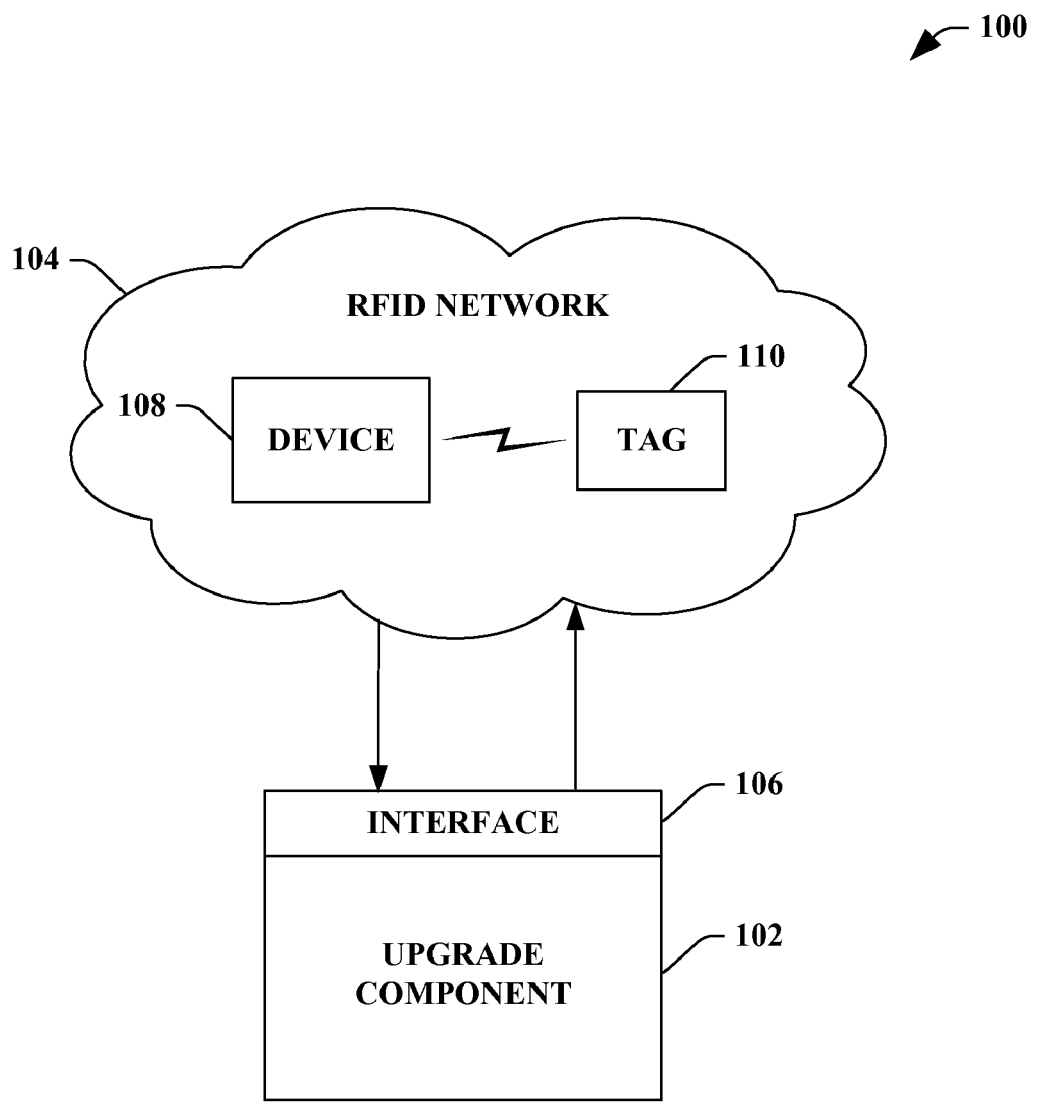
FIG. 1 illustrates a block diagram of an exemplary system that facilitates ascertaining a portion of firmware related to a device within an RFID network.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "device," "tag," "process," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates ascertaining a portion of firmware related to a device within a radio frequency identification (RFID) network. The system 100 can include an upgrade component 102 that can evaluate at least one device 108 that collects data from a tag 110 within an RFID network 104 in order to identify applicable and/or appropriate firmware. Generally, the upgrade component 102 can receive data from the RFID network 104 via an interface component 106 (discussed in more detail below) in order to evaluate existing firmware (if any) with the device 108, wherein the upgrade component 102 can identify a portion of applicable (e.g., newer version, patch, update, software upgrade, correct model, correct type, correct brand, compatible, etc.) firmware that corresponds to the device 108 for deployment. It is to be appreciated that the upgrade component 102 facilitates identifying the appropriate firmware for the device 108 and/or ascertaining the applicability of the firmware for the device 108.

For example, the upgrade component 102 can evaluate a plurality of devices 108 associated with the RFID network 104. In particular, the device evaluation can detect brand, type, model, maker, corresponding provider, serial number, digital signature, reference name, associated firmware on the device 108, existing firmware on the device 108, the existence of any portion of firmware on the device 108, most any suitable characteristic associated with the device 108 to distinguish from a disparate device, etc. Based at least upon the evaluation of the device(s) 108, the upgrade component 102 can identify at least a portion of most any suitable applicable data such as, but not limited to, firmware, portion of software, portion of an application, portion of code related to the device, a portion of data that corrects a defect, and/or disparate data (compared to existing data already included with the device 108) related to the device 108. Thus, the system 100 facilitates maintaining and/or ensuring the appropriate and current software is deployed on the device 108.

It is to be appreciated that the device 108 within the RFID network 104 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network 104 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100, wherein each device 108 and/or tag 108 can be of various makers, models, types, brands, etc.

In one example, the RFID network 104 can include at least one device 108 that is associated with at least one RFID process (not shown). It is to be appreciated that the RFID process can utilize any suitable number of devices 108 within the RFID network 104. The RFID process can be related to a particular RFID sub-system (e.g., an RFID server, RFID network, etc.) that is an uber or high-level object that forms together various entities to create a meaningful unit of execution. The RFID process can be and/or can include an outbound process (e.g. pick, pack, shipping scenario, etc.), a manufacturing process, a shipping process, a receiving process, tracking, data representation, data manipulation, data application, security, etc. For instance, the RFID process can utilize the received tag data for processing within a pipeline allowing various components (e.g., event handlers, filters, transforms, aggregations, managed code running in the context of the RFID process, etc.) to implement such data as necessary. Additionally, the RFID process can include and/or respond to a device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and/or a business rule engine (not shown).

Moreover, the system 100 can include any suitable and/or necessary interface component 106 (herein referred to as "interface 106"), which provides various adapters, connectors, channels, communication paths, etc. to integrate the upgrade component 102 into virtually any operating and/or database system(s). In addition, the interface 106 can provide various adapters, connectors, channels, communication paths, etc., that provide for interaction with the upgrade component 102, the RFID network 104, the RFID process, and any other device, tag, and/or component associated with the system 100.

Figure 2:
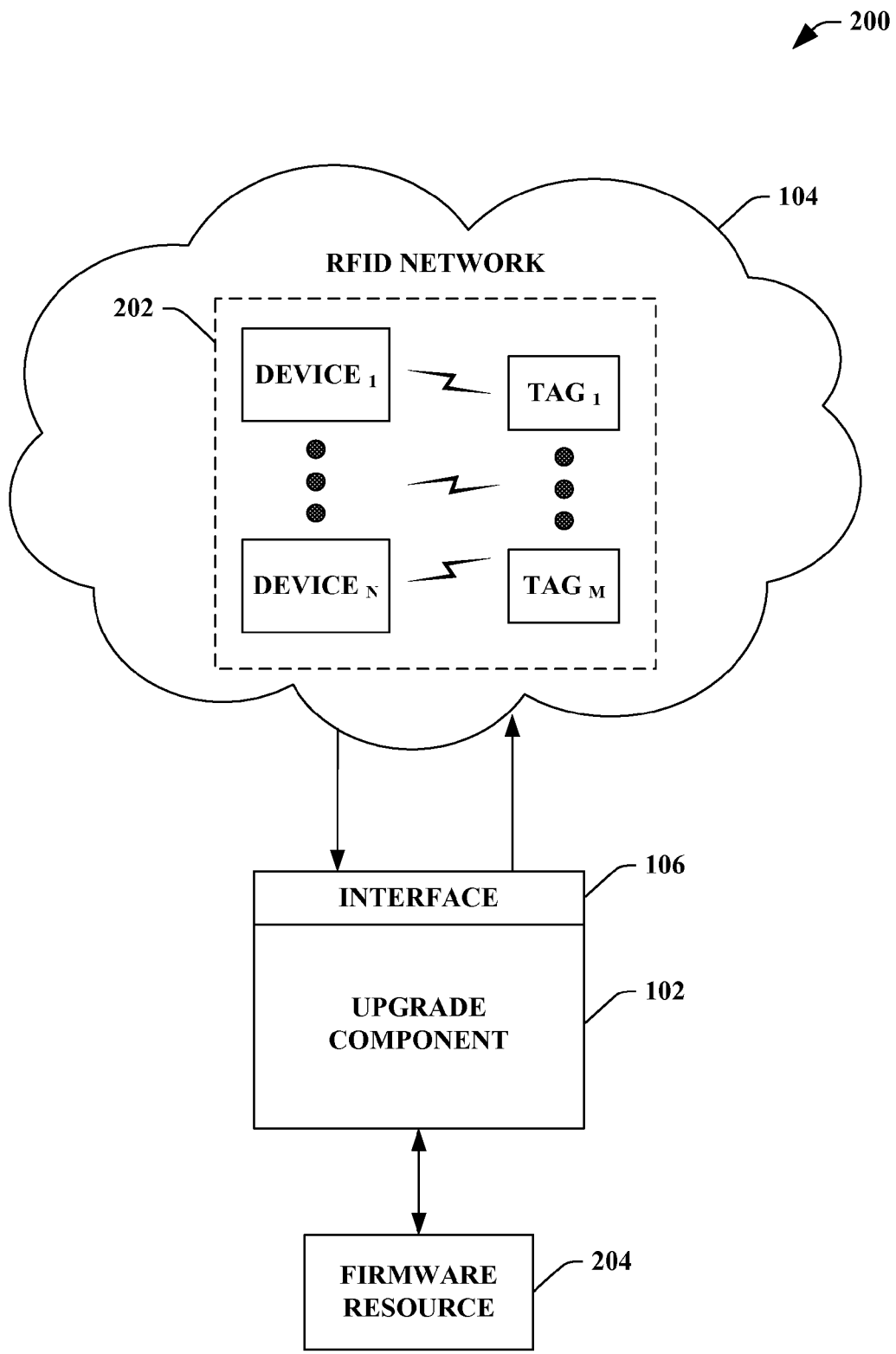
FIG. 2 illustrates a block diagram of an exemplary system that facilitates identifying a portion of firmware respective to a device within an RFID network in order to deploy applicable firmware to the device.

FIG. 2 illustrates a system 200 that facilitates identifying a portion of firmware respective to a device within an RFID network in order to deploy applicable firmware to the device. The system 200 can include the upgrade component 102 that enables a portion of firmware to be identified and deployed onto a device associated with the RFID network 104. It is to be appreciated that the upgrade component 102 can evaluate at least one device to ascertain whether firmware is absent, whether firmware requires an upgrade to a more current version, and/or whether firmware is to be replaced. In general, the upgrade component 102 facilitates identifying devices and selecting a portion of firmware that is to be deployed thereupon.

The RFID network 104 can be implemented by any enterprise, business, facility, and/or any suitable entity that can utilize RFID technology. For instance, the RFID network 104 can be deployed to include any number of devices and tags 202 such as device$_1$ to device$_N$, where N is positive integer. Moreover, such devices can interact (e.g., wirelessly communicate) with any number of tags such as tag$_1$ to tag$_M$, where M is a positive integer to provide an event, a tag read event, a tag read, etc. It is to be appreciated that the devices can be at least one of the following: an RFID reader, an RFID writer, an RFID printer, an RFID transmitter, a sensor, a real-time device, an RFID receiver, a real-time sensor, a device extensible to a web service, a real-time event generator, etc. In addition, the device can be associated with at least an antenna to communicate data. Furthermore, it is to be appreciated that the tags can be associated to any suitable object related to the enterprise, business, facility, and/or any suitable entity utilizing such RFID technology.

The devices and tags 202 can be associated with at least one RFID process. It is to be appreciated that the RFID process 112 can run in the same host as a server (not shown and also referred to as an RFID server), the upgrade component 102, and/or any combination thereof. Although only a single RFID process is discussed, it is to be appreciated that a plurality of RFID processes can be executed in conjunction with the RFID network 104. The RFID network 104 can include various sub-systems and/or groups based at least in part upon device location, device functionality, device security level, process device association, make and/or model of device, type of device, device frequency, etc. For example, an RFID network 104 can include two groups and/or collections of devices, one at a shipping door and another at a receiving door. Such RFID network 104 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process can be a business process, wherein the devices can be indirectly utilized in association with the business process (not shown). In an example, an RFID stack can bridge the gap between devices and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time.

In another example, an RFID host and/or server associated with the RFID network 104 can utilize a business rules engine (not shown), wherein such business rules engine can provide a rule-based system in association with any application related to the RFID network 104 such that a filter and/or alert can be utilized as a rule(s). The business rules engine can execute declarative filters and/or alerts as rules associated with an RFID network 104, wherein the rules can include a rule set adhered to an event, condition, and action format utilizing an extensible markup language (XML). The rule is at least one of the following: contained within a rule set that adheres to an event, a condition, an action; and/or represented utilizing an extensible markup language (XML). Moreover, the condition has at least one of a set of predicates and/or a logical connective to form a logical expression that evaluates to one of a true and a false.

The RFID process (also referred to as the process) can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

The upgrade component 102 can further utilize a firmware resource 204 that can provide at least a portion of firmware to be deployed onto at least one device. It is to be appreciated that the firmware resource 204 can be at least one of a provider, a third-party, a service, a third-party service, a vendor, a manufacturer, a device-maker, a company, a web-service, a website, a database, an email, a data store, a local service, a remote party, and/or most any suitable entity that can provide a portion of firmware. For example, the upgrade component 102 can evaluate and ascertain at least one device within the RFID network 104, wherein the upgrade component 102 can utilize the firmware resource 204 to provide and/or identify a portion of applicable firmware for the device based on the evaluation.

Figure 3:
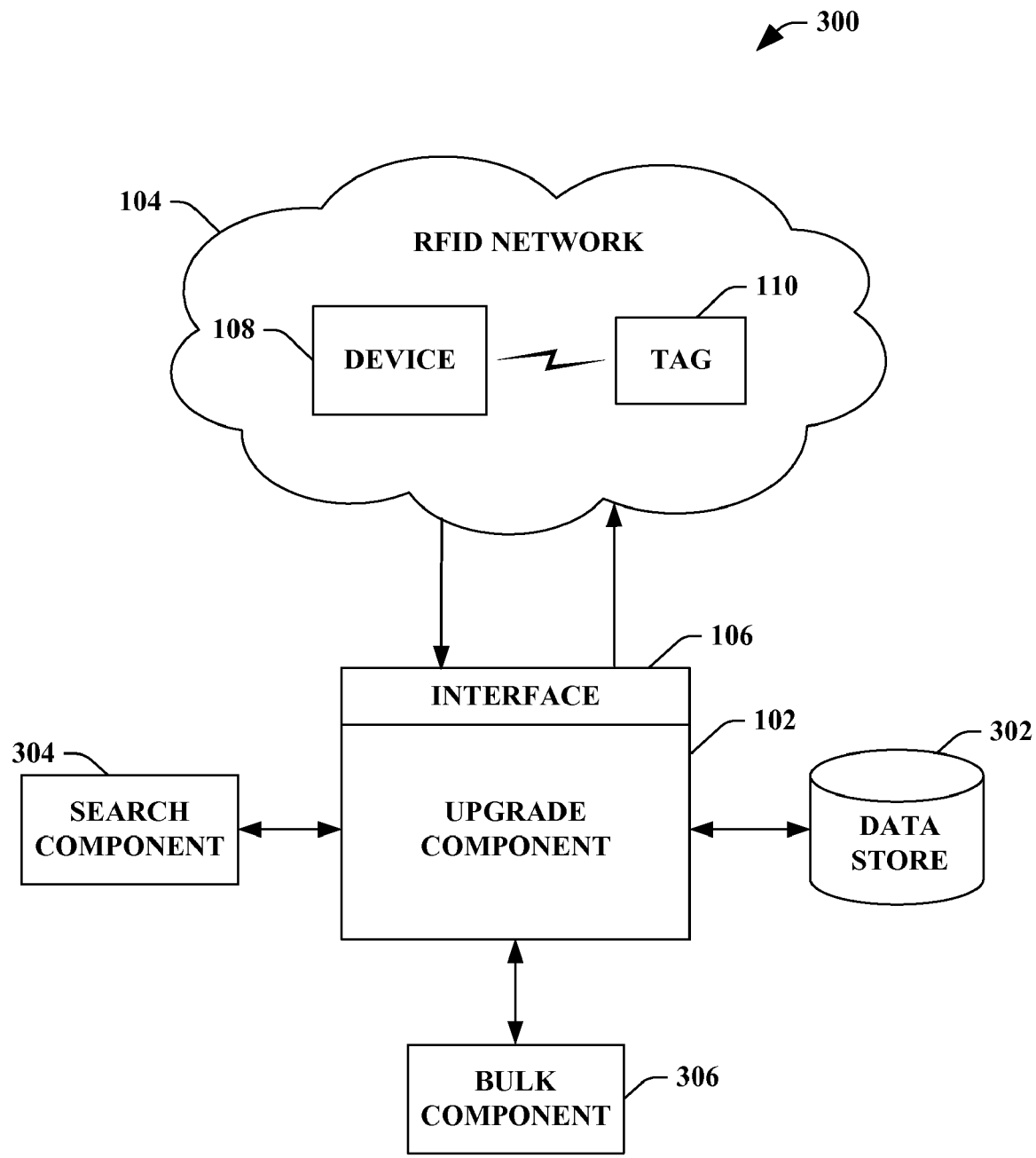
FIG. 3 illustrates a block diagram of an exemplary system that facilitates evaluating a plurality of devices within an RFID network to ascertain applicable firmware upgrades which deploy independently thereof.

FIG. 3 illustrates a system 300 that facilitates evaluating a plurality of devices within an RFID network to ascertain applicable firmware upgrades which deploy independently thereof. The system 300 can include the upgrade component 102 that can evaluate at least one device 108 within the RFID network 104 in order to identify a portion of applicable firmware to be deployed thereupon. The system 300 can further include a data store 302 that can store various data related to the system 300. For instance, the data store 302 can include most any suitable data related to most any suitable device 108 associated with the RFID network 104, an RFID process (not shown), an RFID server (not shown), an RFID host (not shown), etc. For example, the data store 302 can store data such as, but not limited to, device data (e.g., make, model, brand, type, version, etc.), device characteristics (e.g. reader, writer, location, functionality, etc.), firmware, current firmware, previously utilized firmware, existing firmware, a portion of firmware data, deployment status, firmware historic data, firmware historic deployment data, etc.

The data store 302 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 302 of the subject systems and methods is intended to comprise, without being limited to, these and any other suitable types of memory and/or storage. In addition, it is to be appreciated that the data store 302 can be a server, a database, a relational database, a hard drive, and the like.

The upgrade component 102 can utilize a search component 304 that identify portions of firmware utilized by the device 108 and/or portions of firmware that can be upgraded to a disparate and/or more current firmware. The search component 304 can locate a device and/or a portion of firmware, wherein the device and/or the portion of firmware may require an update, a patch, a more current version of firmware, a new version of firmware, and the like. For example, the search component 304 can locate a device and a respective portion of firmware that may require a disparate portion of firmware deployed. Moreover, the search component 304 can identify an applicable portion of firmware (e.g., newer version, patch, update, software upgrade, correct model, correct type, correct brand, compatible, etc.) that is to be deployed to the device 108.

The upgrade component 102 can utilize a bulk component 306 that facilitates identifying and deploying firmware to a plurality of devices 108, wherein each deployment can be independent and concurrent. In other words, the bulk component 306 can allow the evaluation of a plurality of devices, the identification of a portion of applicable firmware for the plurality of devices, and/or independent deployment of each portion of applicable firmware to each individual device of the plurality of devices. For example, the upgrade component 102 can evaluate the devices within the RFID network 104 in which a portion of applicable firmware can be identified. The bulk component 306 can allow the independent deployment of each portion of firmware respective to each device that requires an upgrade. Thus, the bulk component 306 can enable each portion of applicable firmware to be streamed out to each device. The deployment can be independent such that device 1 and device 2 can independently receive and deploy the respective firmware.

Figure 4:
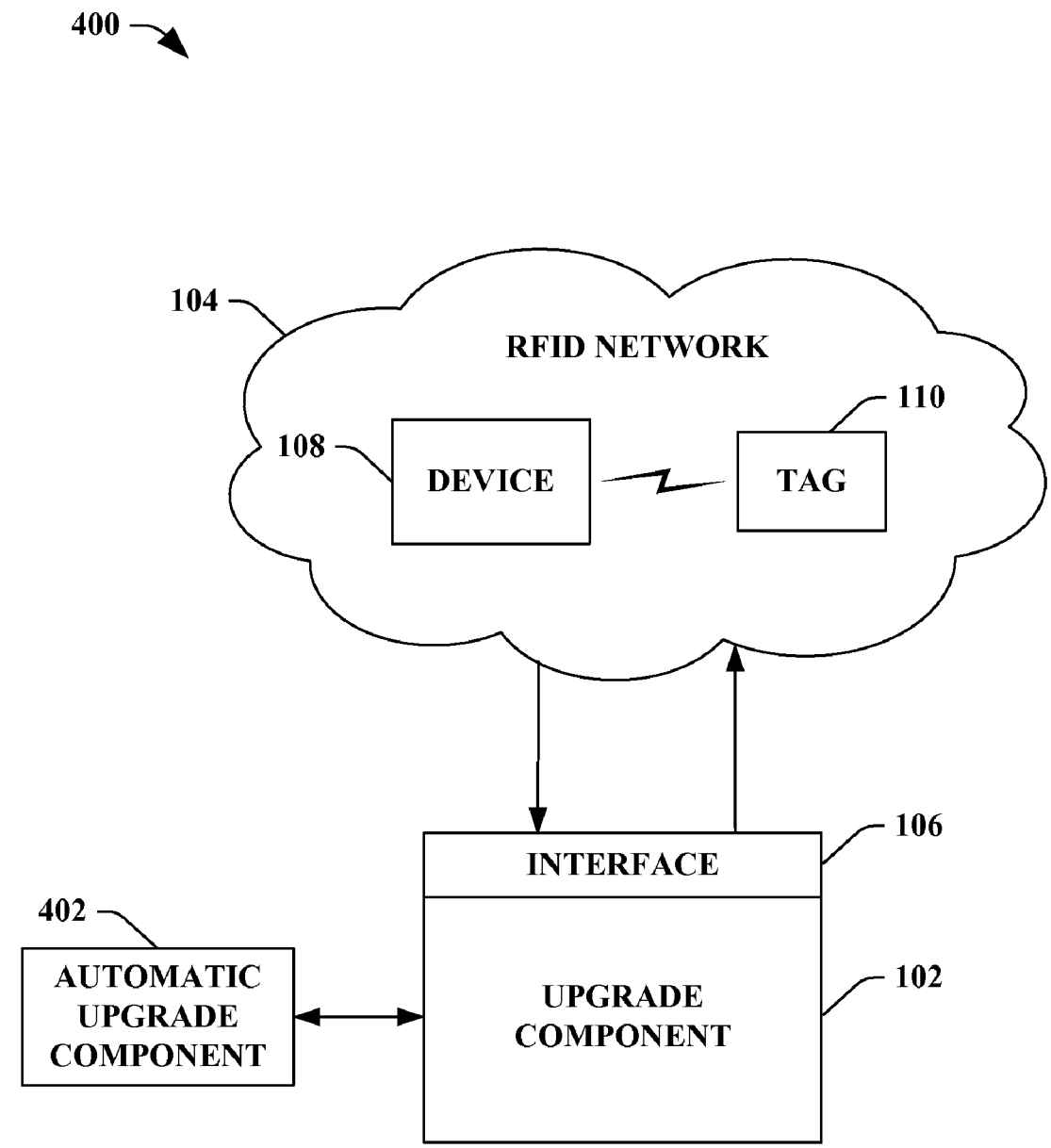
FIG. 4 illustrates a block diagram of an exemplary system that facilitates automatically identifying and/or deploying a portion of applicable firmware to a device within an RFID network.

FIG. 4 illustrates a system 400 that facilitates automatically identifying and/or deploying a portion of applicable firmware to a device within an RFID network. The system 400 can include the upgrade component 102 that can glean information related to the device 108 in order to identify a portion of applicable firmware to be deployed thereon. In other words, the upgrade component 102 can evaluate the existing firmware associated with the device 108 and/or evaluate if any portion of firmware exists on the device 108. Based at least in part upon the evaluation, the upgrade component 102 can identify a portion of firmware that can be automatically deployed to the device 108 to ensure up-to-date and efficient implementation of the device 108.

The upgrade component 402 can utilize an automatic upgrade component 402 that can employ an automatic monitoring of whether or not any updates are available for the device 108. In particular, the automatic upgrade component 402 can utilize an automatic update check technique associated with most any Operating System (OS). Thus, the automatic upgrade component 402 can be incorporated with the update checking technique and/or mechanism related to an Operating System (OS) such that in addition to updates identified for the Operating System (OS), the technique and/or mechanism can identify a portion of applicable firmware update(s) for at least one device 108.

In another example, the automatic upgrade component 402 can employ an agent that can execute within the RFID network 104 and/or an RFID server/host (not shown). The agent can be most any suitable portion of code and/or data that can poll, check, and/or identify for most any suitable updates related to firmware corresponding to specific devices. Based upon, for instance, an applicability rule, the agent can identify portions of firmware and deploy and/or push such portions of firmware to particular devices. The implementation of an agent enables an automatic identification and/or deployment of applicable portions of firmware to the devices such that the agent can run and/or execute in the background of the system 400.

The system 400 can provide at least one physical device proxy technique and/or mechanism. For example, the following can be physical device proxy techniques:

| Method | Description |
|---|---|
| public abstract FirmwareComparisonInformation CheckFirmwareCompatibility(string firmwareLocation); public abstract void BeginApplyFirmwareUpgrade(string firmwareLocation); | firmwareLocation is the directory where the firmware file(s) are located. |

Moreover, the system 400 can provide at least one device manger proxy technique and/or mechanism. For example, the following can be device manager proxy techniques:

| Method | Description |
|---|---|
| public abstract FirmwareComparisonInformation CheckFirmwareCompatibility(string device, string firmwareLocation); public abstract void BeginApplyFirmwareUpgrade(string device, string firmwareLocation); | firmwareLocation is the directory where the firmware file(s) are located. |

The system 400 can further implement a FirmwareUpgradeProgressEvent management event, which a provider can raise once the firmware upgrade for a device is initiated. The event can give a status of the firmware upgrade in real-time. In one example, the status can be given based on a percentage of firmware upgrade and/or a period of time. For instance, the status can be raised once every 5% of firmware upgrade and/or 5 seconds, whichever occurs sooner. For instance, the following pseudo code can be employed with the subject innovation:

```
public sealed class FirmwareUpgradeProgressEvent :
DeviceManagementEvent
{
    /// <summary>
    /// Percent of the firmware upgrade that has completed
    /// </summary>
    private float m_percentCompleted;
    /// <summary>
    /// Any exception that might occur while upgrading firmware.
    /// </summary>
    private FirmwareUpgradeException
    m_firmwareUpgradeExceptionInformation;
    /// <summary>
    /// Whether or not this is the last firmware upgrade event for
    this device.
```

```
    /// If this is true when 100% of the firmware upgrade has been
    completed,
    /// then the firmware upgrade was successful, otherwise it was
    unsuccessful.
    /// The value of this field also indicates whether any exception
    encountered
    /// during firmware upgrade (denoted by
    m_firmwareUpgradeExceptionInformation)
    /// is fatal (if this is true and an exception was raied) or non fatal (this
    /// field is false when the exeption is raised).
    /// </summary>
    private bool m_isLastEvent;
}
```

The system 400 can further employ a particular workflow. The following workflow is illustrated solely for example and is not to be limiting on the subject innovation. An administrator can get access to a firmware package for at least one device supported by a particular provider and can store the package on a file share. Using the subject innovation (e.g., system 400), the administrator can select a device for which a firmware upgrade is to be applied. For each device, a CheckFirmwareCompatibility( ) can be called. Based on the results of the call, the following information can be displayed:

| Name of Device | Current Firmware Version | Firmware version to be applied | Applicability |
|---|---|---|---|
| Device_a | xx.yy.zz.1000 | xx.yy.zz.1001 | Yes |
| Device_b | xx.yy.zz.1001 | xx.yy.zz.1001 | No - already installed 2 weeks ago |
| Device_c | xx.yy.zz.1178 | xx.yy.zz.1001 | No - update expected to be available next month |

The system 400 can further call BeginApplyFirmwareUpgrade( ) sequentially on each device, wherein the progress of the firmware upgrade can be monitored by listening to the FirmwareUpgradeProgressEvent management event. This can continue until a firmware resource (e.g., a provider, a third-party, etc.) specifies that the upgrade has completed (e.g., m_is LastEvent is set to true). Upon successful completion of the upgrade, the value of percentCompleted of the last FirmwareUpgradeProgressEvent can be 100%, otherwise the exception m_firmwareUpgradeExceptionInformation can be set. The system 400 can time out if a FirmwareUpgradeProgressEvent is not received for more than a pre-determined time (e.g., hence the example and/or recommendation that firmware resources/providers send the FirmwareUpgradeProgressEvent at least once every 5 seconds).

The system 400 can further ensure that once firmware upgrade has begun for a device, that device is in a disabled state (e.g., a new state for the device—FirmwareUpgradeInProgress). This can ensure that no command on the device can be inadvertently executed while firmware upgrade is in progress. For example, the device can exit from this state either by the user explicitly enabling the device and/or the device raising a discovery event.

Figure 5:
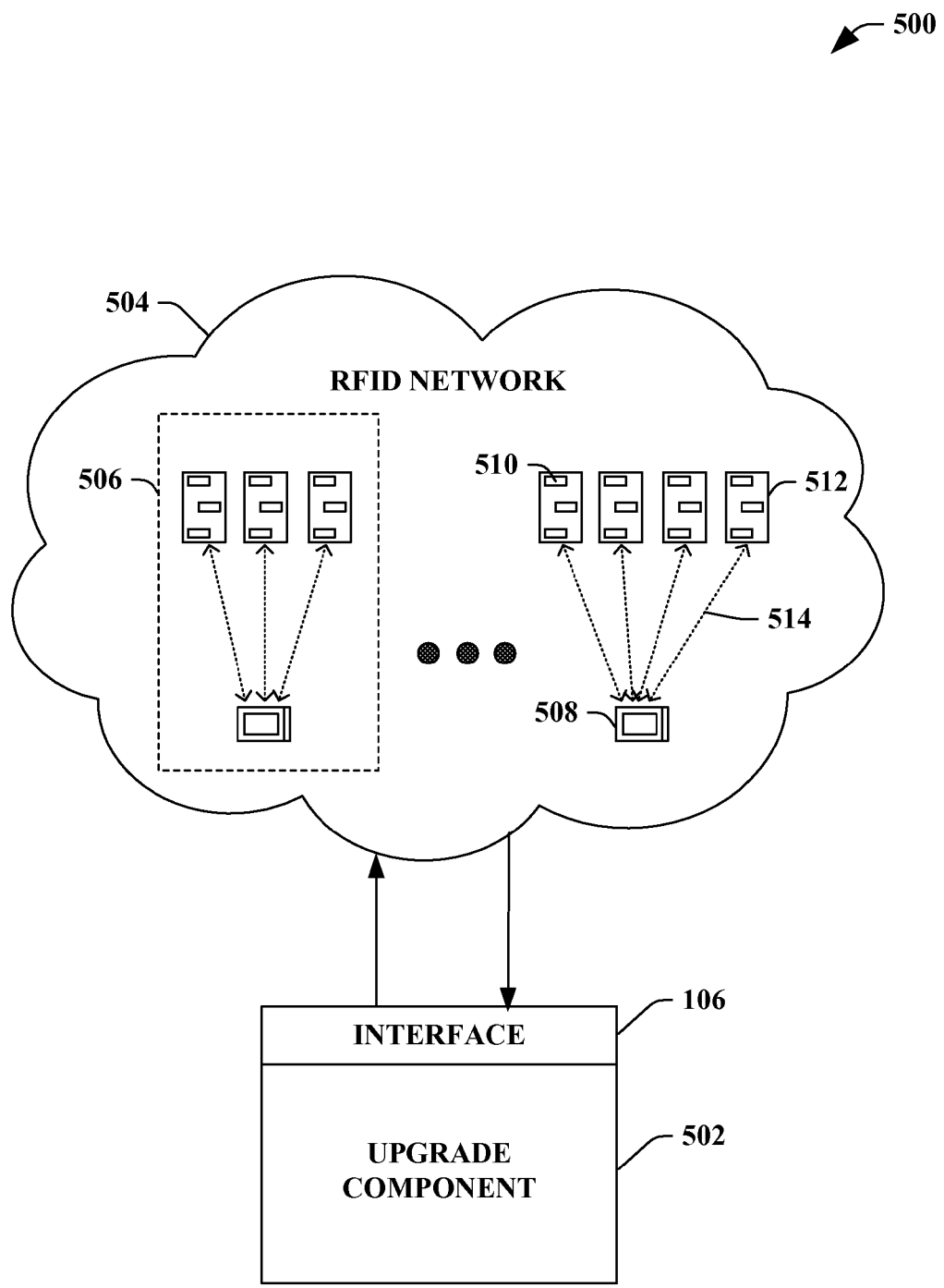
FIG. 5 illustrates a block diagram of an exemplary system that facilitates collecting data from an RFID device within an RFID network.

FIG. 5 illustrates a system 500 that facilitates collecting data from an RFID device within an RFID network. The system 500 can include an upgrade component 502 that can collect real-time data related to an RFID network 504 and/or an RFID process (not shown). The upgrade component 502 can provide real-time data related to an entity associated with at least one of an RFID server (not shown), an RFID host (not shown), the RFID network 504, the RFID process, and/or any combination thereof. Moreover, the real-time data and/or updates can be, but are not limited to, a status, a state, details/information, connectivity, a setting, etc. Furthermore, it is to be appreciated that the upgrade component 502 and the RFID network 504 can be substantially similar to previously described figures.

The RFID network 504 can include a plurality of universes (e.g., sub-systems, RFID networks), wherein a universe is a server of RFID entities. For simplicity, the RFID network 504 illustrates a single universe containing two collections of devices (e.g. device collections), where a first collection 506 is shown. It is to be appreciated that the device collections can correspond to device groups as utilized by the upgrade component 502, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

Figure 6:
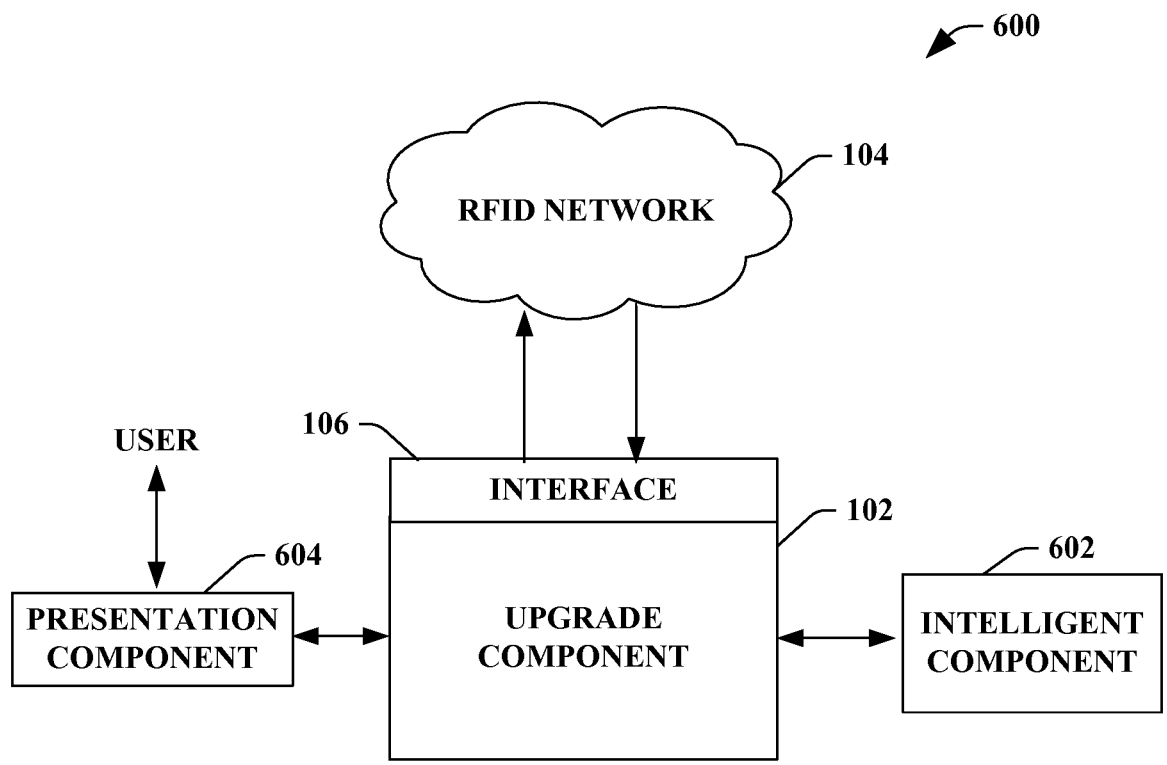
FIG. 6 illustrates a block diagram of an exemplary system that facilitates ascertaining a portion of firmware related to a device within an RFID network.

FIG. 6 illustrates a system 600 that employs intelligence to facilitate ascertaining a portion of firmware related to a device within an RFID network. The system 600 can include the upgrade component 102, the RFID network 104, and the interface 106 that can all be substantially similar to respective components and interfaces described in previous figures. The system 600 further includes an intelligent component 602. The intelligent component 602 can be utilized by the upgrade component 102 to facilitate evaluating and identifying a portion of applicable firmware for a device within the RFID network 104. For example, the intelligent component 602 can infer device data, device make, device model, device type, device characteristics, device settings, device brand, device firmware, a portion of firmware applicability, applicability of firmware for a specific device, a version of firmware, a version of a device, a deployment setting for firmware, a deployment timing, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)$=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The upgrade component 102 can further utilize a presentation component 604 that provides various types of user interfaces to facilitate interaction between a user and any component coupled to the upgrade component 102. As depicted, the presentation component 604 is a separate entity that can be utilized with the upgrade component 102. However, it is to be appreciated that the presentation component 604 and/or similar view components can be incorporated into the upgrade component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the upgrade component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
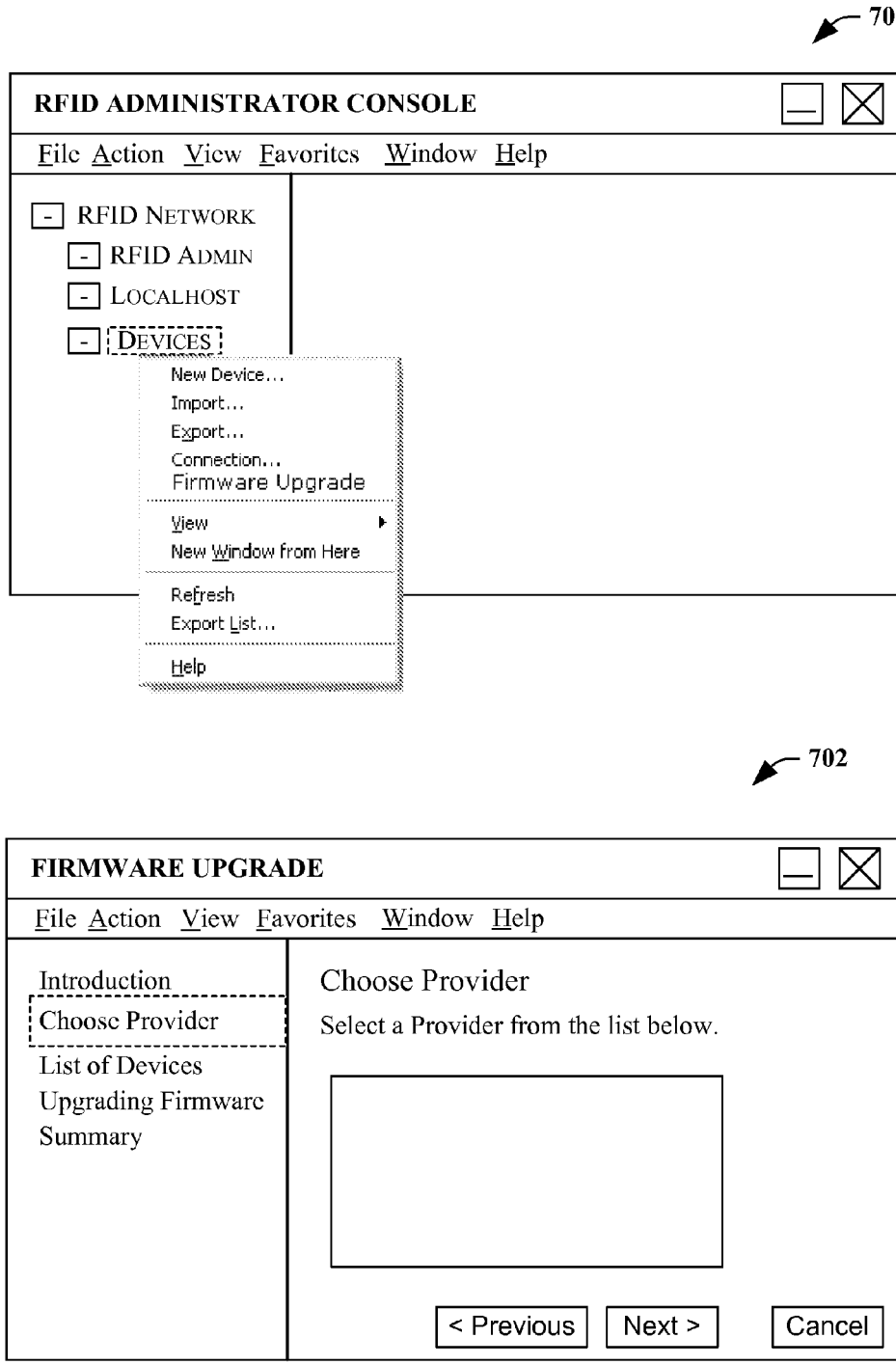
FIG. 7 illustrates a block diagram of exemplary user interfaces that facilitate deploying a portion of firmware to at least one device that collects data from a tag.

FIG. 7 illustrates exemplary user interfaces that facilitate deploying a portion of firmware to at least one device that collects data from a tag. A user interface 700 can facilitate selecting at least one device associated with an RFID network, wherein based upon such selection a portion of applicable firmware can be identified and/or deployed. The user interface 700 can be an RFID administrator console that includes options related to the RFID network. In particular, the user interface 700 can allow options associated with the devices within the RFID network. For instance, the options can include at least one of adding a new device (e.g., new device), import, export, connection, firmware upgrade, view, new window, refresh, export list, help, etc. In particular, the firmware upgrade option can be employed by the user interface 700 in order to facilitate ensuring up-to-date firmware is deployed and/or utilized with at least one device within the RFID network. Upon selecting the firmware upgrade option, a series of user interfaces can be implemented in order to evaluate devices and/or identify appropriate firmware (discussed supra).

A user interface 702 can enable a provider to be selected. The provider can be, but is not limited to being, a portion of data and/or code/software that enables compatibility of at least one device into the RFID network. For instance, the user interface 702 can display available providers that are associated with the RFID network and/or server/host. For example, the RFID network can include a plurality of providers such as an EPC-G compliant provider, a first proprietary provider, a second proprietary provider, etc. Thus, the EPC-G compliant provider can be associated with at least one EPC-Global device, the first proprietary provider can be associated with a first legacy device, the second proprietary provider can be associated with a second legacy device and so on and so forth.

Figure 8:
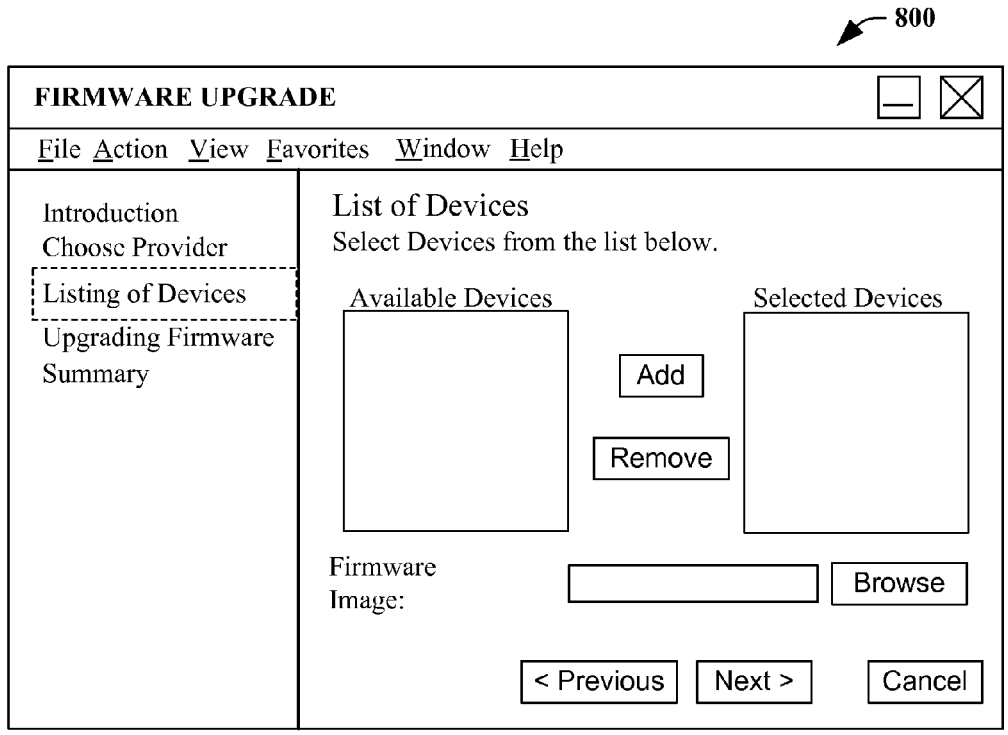
FIG. 8 illustrates a block diagram of exemplary user interfaces that facilitate ascertaining a portion of applicable firmware that can be deployed to a device.
Figure 8:
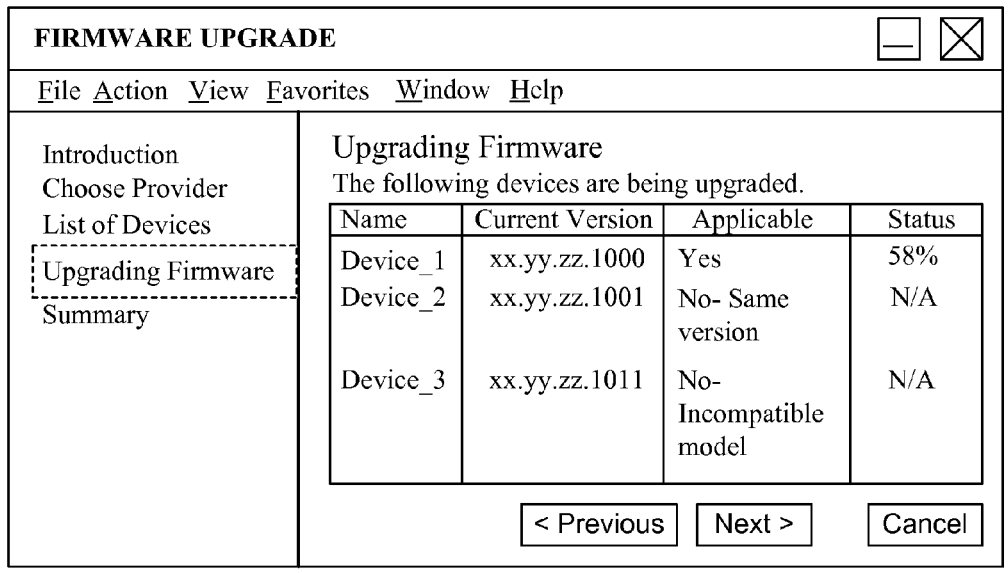

FIG. 8 illustrates exemplary user interfaces for ascertaining a portion of applicable firmware that can be deployed to a device. A user interface 800 can allow the selection of particular devices associated with the selected provider, wherein the selected devices can be the basis to identify firmware related thereto. As depicted, the user interface 800 can display the available devices, selected devices, an image related to the firmware, a browse technique, an option to add a device, an option to remove the device, etc. It is to be appreciated that based on such selecting devices, the user interface 800 can evaluate such devices in order to facilitate identifying respective portion of applicable firmware.

A user interface 802 can continue the firmware upgrade for the provider specified and the selected devices from previous user interfaces (e.g., user interface 700, user interface 702, and user interface 800). The user interface 802 can display the name of the devices selected from the specified provider, a current version of related firmware, applicability, and/or status of download and/or deployment. It is to be appreciated that various details and/or characteristics can be displayed with the user interface 802 and the claimed subject matter is not so limited. For instance, the user interface 802 can display any suitable data such as, but not limited to, device data (e.g., make, model, brand, type, location, cost, connectivity, etc.), firmware data (e.g., manufacturer, company, make, data, cost, location of source, etc.), deployment and/or installation data (e.g., location of source, speed, target location, status of deployment, status of download, status of upload, etc.), and/or applicability data (e.g., versioning conflict, model compatibility, future release of applicable firmware, anticipated version of firmware, etc.).

Figure 9:
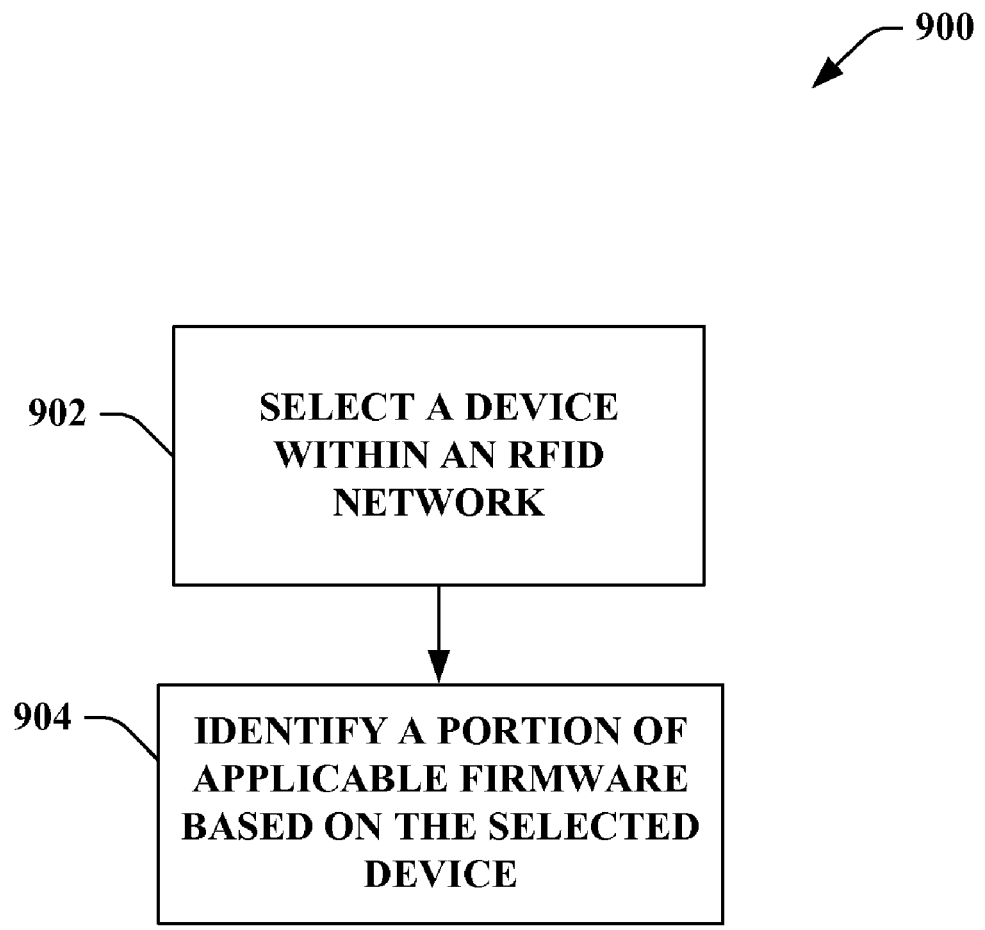
FIG. 9 illustrates an exemplary methodology that facilitates ascertaining a portion of firmware related to a device within an RFID network.
Figure 10:
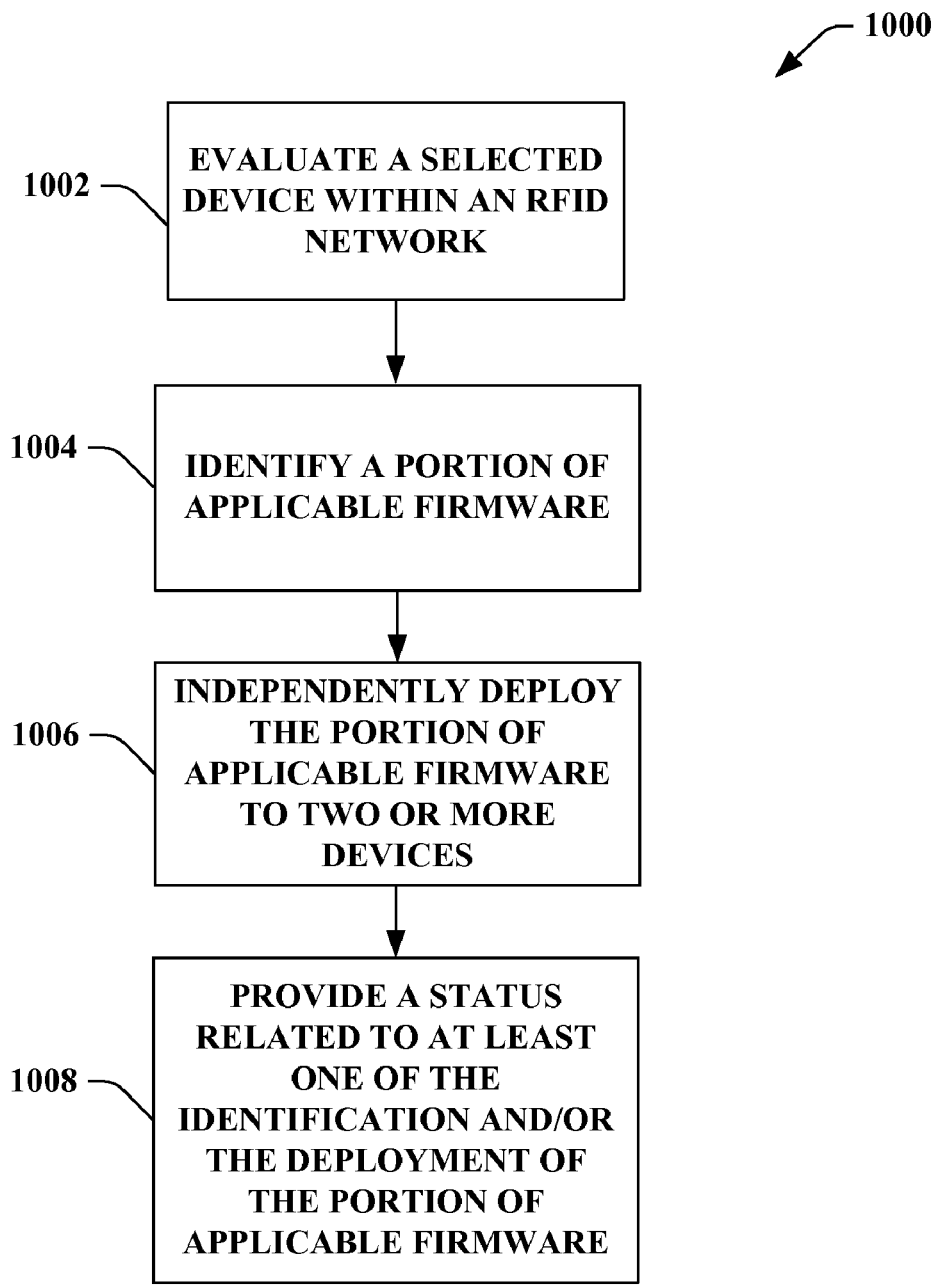
FIG. 10 illustrates an exemplary methodology for automatically identifying and/or deploying a portion of applicable firmware to a device within an RFID network.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 9 illustrates a methodology 900 that facilitates ascertaining a portion of firmware related to a device within an RFID network. At reference numeral 902, a device within an RFID network can be selected. For instance, a user and/or administrator can select a device within the RFID network utilizing a user interface (UI), a graphical user interface (GUI), etc. The device can be selected and/or identified based on most any suitable characteristic such as, but not limited to, provider, maker, model, physical location, functionality, type, brand, device name, process association, etc. At reference numeral 904, a portion of applicable firmware can be identified based on the selected device. For example, the selected device can be evaluated in order to identify a portion of applicable firmware, wherein the applicability can be based on at least one of a newer version, patch, update, software upgrade, correct model, correct type, correct brand, compatible, etc. Furthermore, the firmware identified can be most any suitable applicable data such as, but not limited to, firmware, software, update, patch, version, software upgrade, and/or disparate data (compared to existing data already included with the device) related to the device, etc.

For example, the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Moreover, the device can relate to an RFID network. The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, etc.

FIG. 10 illustrates a methodology that facilitates automatically identifying and/or deploying a portion of applicable firmware to a device within an RFID network. At reference numeral 1002, a selected device within an RFID network can be evaluated. It is to be appreciated that the devices can be at least one of the following: an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc. The RFID network can be implemented by any enterprise, business, facility, and/or any suitable entity that can utilize RFID technology. For instance, the RFID network can be deployed to include any number of devices such as device$_1$ to device$_N$, where N is positive integer. Moreover, such devices can interact (e.g., wirelessly communicate) with any number of tags such as tag$_1$ to tag$_M$, where M is a positive integer.

At reference numeral 1004, a portion of applicable firmware can be identified. In particular, the portion of applicable firmware can be identified utilizing a firmware resource, wherein the firmware resource can provide at least a portion of firmware to be deployed onto at least one device. It is to be appreciated that the firmware resource can be at least one of a provider, a third-party, a service, a third-party service, a vendor, a manufacturer, a device-maker, a company, a web-service, a website, a database, an email, a data store, a local service, a remote party, and/or most any suitable entity that can provide a portion of firmware.

At reference numeral 1006, the portion of applicable firmware can be independently deployed to two or more devices. For instance, the portion of applicable firmware can be independently deployed to each individual device regardless of the number of devices. In one example, the independent deployment of each portion of applicable firmware respective to each device that requires an upgrade can be allowed. Thus, each portion of applicable firmware can be streamed out to each device that the firmware corresponds. At reference numeral 1008, a status related to at least one of the identification and/or deployment of the applicable portion of firmware can be provided. In one example, the real-time status of a search related to finding a particular portion of firmware for a device can be provided. In another example, a real-time status related to deployment completion associated with the device in the RFID network can be provided. It is to be appreciated that the methodology 1000 can further include utilizing most any suitable user interface (UI) and/or graphical user interface (GUI).

Figure 11:
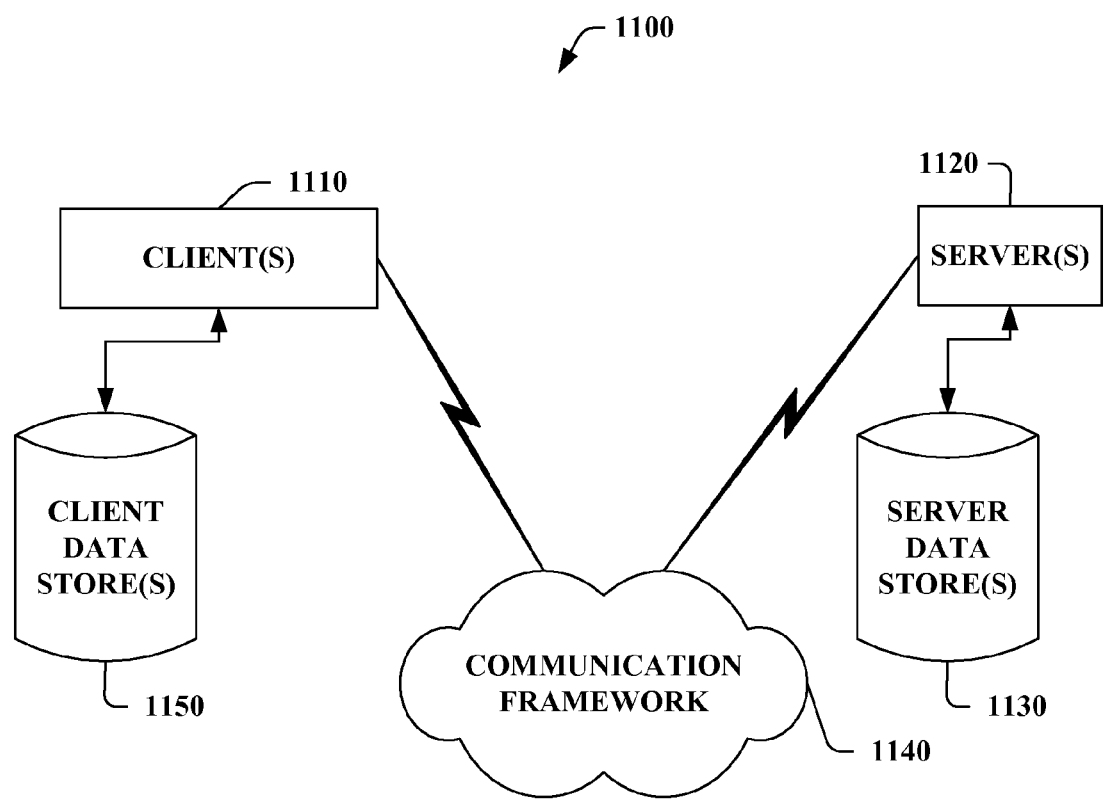
FIG. 11 illustrates an exemplary networking environment, wherein the novel aspects of the claimed subject matter can be employed.
Figure 12:
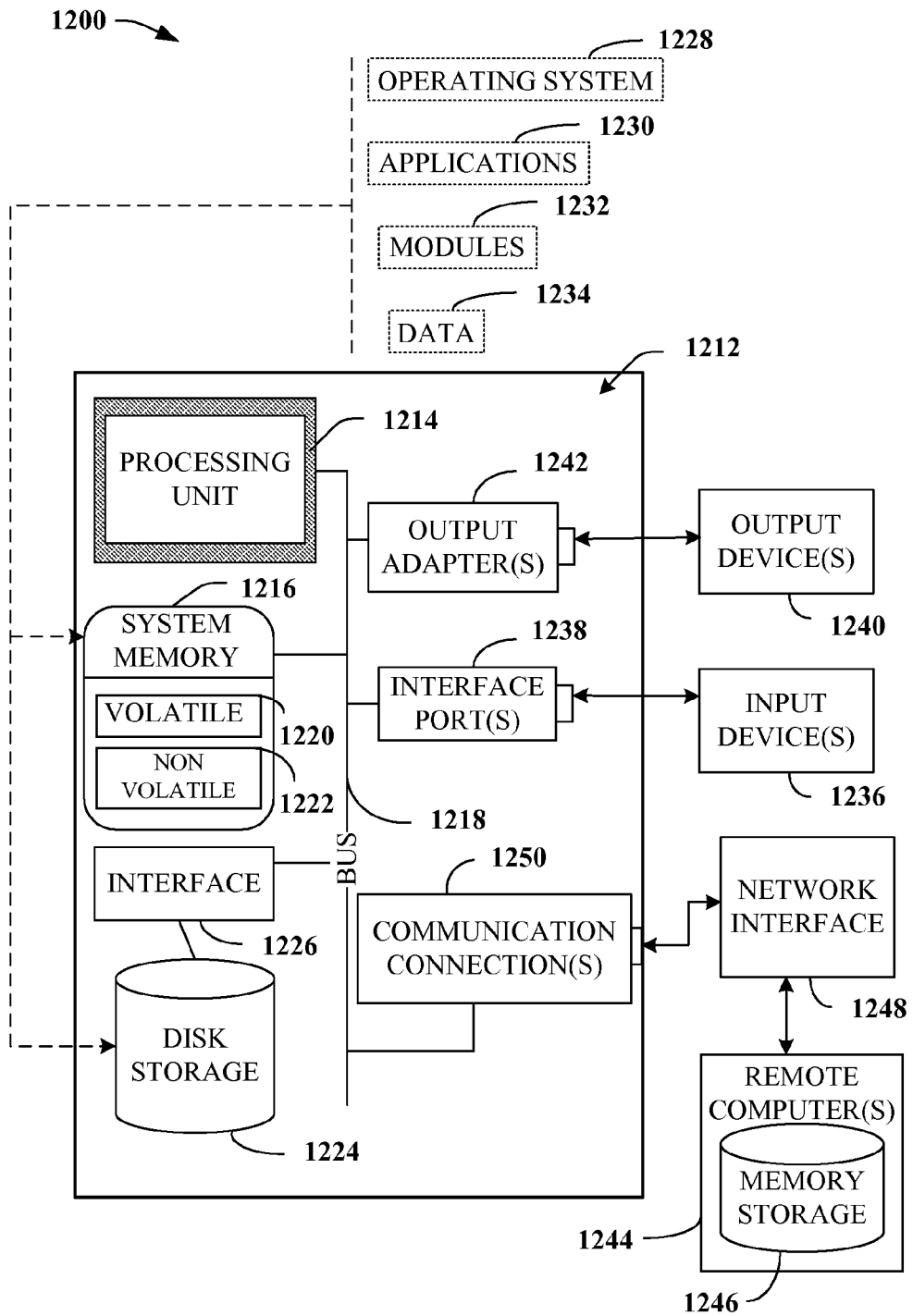
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, an upgrade component that identifies device firmware upgrades that correspond to specific devices to facilitate software installation, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system to facilitate managing a device within a radio frequency identification (RFID) network, comprising:
   a radio frequency identification (RFID) network that includes a plurality of devices each configured to receive data from an RFID tag;
   an upgrade component configured to evaluate the plurality of devices and identify an applicable portion of firmware for each of the plurality of devices based on the evaluation, and, based on the identifying, to deploy applicable portions of firmware to each of the plurality of devices independently of each other;
   a bulk component configured to enable concurrent streaming of the applicable portions of firmware to selected ones of the plurality of devices;
   and
   a presentation component configured to facilitate selecting the applicable portions of firmware and displaying information associated with the plurality of devices, including
      an interface configured to
         display available providers associated with the RFID network, the available providers including at least a first proprietary provider associated with a first legacy device, and a second proprietary provider associated with a second legacy device, display, in a same window, one or more devices of the plurality of devices available for selection for a firmware upgrade from one or more of the available providers, a subset of selected devices, an image related to the firmware upgrade, an option to add a device to the subset of selected devices and an option to remove a device from the subset of selected devices, and display an identifier of each of the subset of selected devices, a current version of firmware for each of the subset of selected devices, an applicability of upgrade firmware for each of the subset of selected devices, and a status of a deployment of the upgrade firmware for each of the subset of selected devices, based on whether the upgrade firmware is applicable or not.

2. The system of claim 1, wherein the upgrade component is configured to identify, as the applicable portion of firmware for each of the plurality of devices, firmware that is disparate in comparison to firmware existent on each device.

3. The system of claim 1, wherein the plurality of devices include at least one of the following: an RFID reader; an RFID writer; an RFID printer; a reader; a writer; an RFID transmitter; an antenna; a sensor; a real-time device; an RFID receiver; a real-time sensor; a device extensible to a web service; or a real-time event generation system.

4. The system of claim 1, further comprising a firmware resource configured to provide firmware data related to the plurality of devices.

5. The system of claim 4, wherein the firmware resource includes at least one of a provider, a third-party, a service, a third-party service, a vendor, a manufacturer, a device-maker, a company, a web-service, a website, a database, an email, a data store, a local service, or a remote party.

6. The system of claim 1, wherein the applicable portion of firmware for each of the plurality of devices is specific to at least one of a make, a model, a type, or a brand.

7. The system of claim 1, wherein the data is configured to be utilized with an RFID process.

8. The system of claim 7, wherein the RFID process is configured to create a unit of execution that relates to at least one of the following: an outbound process; a manufacturing process; a shipping process; a receiving process; a tracking process; a data representation process; a data manipulation process; or a security process.

9. The system of claim 1, wherein the applicable portion of firmware for each of the plurality of devices includes at least one of a portion of applicable data related to the device, a portion of firmware, a portion of software, a portion of an application, a portion of code related to the device, an upgrade, a patch, a version, a software upgrade, a portion of disparate data not existent on the device, or a portion of data that corrects a defect.

10. The system of claim 1, wherein the interface is further configured to automatically display the status in real time.

11. The system of claim 1, further comprising a search component configured to detect at least a portion of firmware utilized by each of the plurality of devices.

12. The system of claim 1, further comprising an intelligent component configured to infer at least one of device data, device make, device model, device type, device characteristics, device settings, device brand, device firmware, a version of firmware or a deployment timing for at least one of the plurality of devices.

13. The system of claim 1, further comprising an automatic upgrade component configured to employ an automatic monitoring of at least one update or portion of firmware that are available for the plurality of devices.

14. The system of claim 13, wherein the automatic upgrade component is configured to utilize at least one of an automatic update check technique associated with an Operating System (OS), or an agent that executes within the RFID network to automatically identify a portion of applicable firmware to deploy.

15. The system of claim 1, wherein the presentation component is configured to facilitate interaction with the upgrade component.

16. The system of claim 1, wherein the RFID network comprises a collection of devices that form a sub-system which includes:
an RFID reader that receives an RFID signal; and
an RFID tag that transmits to at least one device.

17. A computer-implemented method configured to facilitate managing a device within a radio frequency identification (RFID) network, comprising:
displaying, in an interface, available providers associated with an RFID network including a plurality of devices each capable of receiving data from an RFID tag, the available providers including at least a first proprietary provider associated with a first legacy device, and a second proprietary provider associated with a second legacy device;
further displaying, via the interface and in a same window, one or more of the plurality of devices available to be selected for a firmware upgrade from at least one of the available providers, a selected subset of the available devices, an image related to the firmware, an option to add a device to the selected subset of the available devices and an option to remove a device from the selected subset of the available devices;
identifying portions of applicable firmware for deployment to one or more of the selected subset of available devices;
concurrently streaming the portions of applicable firmware to the one or more of the selected subset of available devices; and
displaying an identifier of each of the subset of selected devices, a current version of firmware for each of the subset of selected devices, an applicability of upgrade firmware for each of the subset of selected devices, and a status of a deployment of the upgrade firmware for each of the selected subset of available devices, based on whether the upgrade firmware is applicable or not.

18. The method of claim 17, further comprising detecting a brand, type, model, maker, corresponding provider, serial number, digital signature, reference name, and associated firmware for at least one of the plurality of devices.

19. The method of claim 17, further comprising providing the status in real time.

20. A computer-readable storage medium storing instructions that if executed by a computing device cause the computing device to perform the method of claim 17.

* * * * *